United States Patent
Bates

[19]

[11] Patent Number: 5,918,392
[45] Date of Patent: Jul. 6, 1999

[54] FABRIC STRETCHING SYSTEM WITH CORNER BRACES

[76] Inventor: Richard I Bates, 2176 Vista Sandia, Santa Fe, N.M. 87501

[21] Appl. No.: 09/037,549

[22] Filed: Mar. 9, 1998

Related U.S. Application Data

[63] Continuation of application No. 08/852,078, May 6, 1997, abandoned.

[51] Int. Cl.$^6$ .................................................. D06C 3/08
[52] U.S. Cl. ..................... 38/102.1; 38/102.4; 403/402; 160/381
[58] Field of Search ................... 38/102, 102.1, 38/102.4, 102.91; 16/87 R, 87.2; 40/549, 603; 403/401–403; 160/381, 374.1, 378; 52/656.9, 657

[56] References Cited

U.S. PATENT DOCUMENTS

| | | | |
|---|---|---|---|
| 893,676 | 7/1908 | Tschantz | 403/401 |
| 2,588,818 | 3/1952 | Franks | 403/402 |
| 3,625,274 | 12/1971 | Johnson | 160/374.1 |
| 3,830,278 | 8/1974 | Packer | 160/378 |
| 3,949,802 | 4/1976 | Buratovich | 160/374.1 |
| 3,978,905 | 9/1976 | de Lama et al. | 160/378 |
| 4,301,853 | 11/1981 | Vidal | 160/374.1 |
| 4,549,596 | 10/1985 | Staro | 160/374.1 |
| 5,115,584 | 5/1992 | Lucchetti | 38/102.91 |
| 5,502,906 | 4/1996 | Yamawaki | 38/102 |
| 5,579,595 | 12/1996 | Dutton | 38/102.1 |

*Primary Examiner*—Ismael Izaguirre
*Attorney, Agent, or Firm*—Ray G. Wilson

[57] ABSTRACT

This fabric stretching system for artists' canvases, silk screens, and the like, utilizes extruded, specially profiled, wood-like material in place of conventional wooden bars to form a frame on which canvas is stretched. Each corner of the frame is joined by two identical corner braces, which mate to profiled features of the frame and lock the bars rigidly together. The extruded frame material, which is made from recycled wood and other organic materials held in a plastic binder, maintains the weight and feel of traditional wooden frames but is free of many of the disadvantages of wood. The material as extruded is ready for use. It needs only to be cut to the desired length, an operation which can be done with a simple miter saw. Two braces are used in each corner, the second containing adjustment screws for tensioning. This arrangement makes for simple assembly and assures a rock solid frame which can be adjusted to provide additional tension on the canvas at time of assembly or at any future time.

5 Claims, 2 Drawing Sheets

FABRIC STRETCHING SYSTEM WITH CORNER BRACES

RELATED CASES

This case is a continuation of U.S. Pat. application Ser. No. 08/852,078, filed May 6, 1997, now abandoned.

BACKGROUND OF THE INVENTION

This invention relates to frames that are used to mount and to provide tension for flexible fabrics, such as artists' canvases, silk screen, and the like, and, more particularly, to frames that that can be adjusted for varying the tension in such fabrics.

In the past most artists' canvases or other fabrics have been mounted on square or rectangular wooden frames the corners of which were mitered and frequently exhibited dove-tail or other types of interlocking features. An artists' canvas is normally attached to the frame with tacks or staples and tensioned by hand to remove wrinkles as it is applied. If additional tension is required at the time of assembly or at a later time it is usually applied by inserting wedges in each corner joint and driving them in with a mallet to spread the joint thereby adding tension to the affixed fabric.

Stretcher frames of this type have numerous disadvantages. The insertion of wedges to adjust tension is a tedious process that subjects a mounted canvas, particularly an old canvas that may have become weak or brittle, to risk of damage. Wooden frames dry, shrink and crack with age tending to loosen the canvas and cause previously inserted tensioning wedges to fall out of the joints. These problems caused by the aging of the wooden frames will become more acute in the future as forests are destroyed and the shortage of quality woods forces the use of less stable wood in frames. A further disadvantage of past framing practice is that the interlocking joinery used in the corners of the frames, due to its complexity and precision, must usually be done by a frame manufacturer rather than at a retail shop most of which have tools no more complex than a miter saw. Thus retailers are required to keep in stock a complete range of sizes of stretcher bars that may be needed rather than stocking bulk material that can easily be cut to the lengths desired.

Stretcher bars should ideally be constructed so that the frame surfaces, which face the painting surface of the fabric, are angled inward so that only the outer edge of each frame member, not the entire surface, comes into contact with the canvas. This ideal mounting can be accomplished by using more complex joinery and/or brackets in each corner of the frame to tilt each frame member so that only the edge of the member contacts the front surface of the fabric or by the expensive milling away a portion of the front surface of each the frame members leaving only a bead of wood along the outer edge of each frame to support the fabric.

These problems are addressed by the present invention, and a fabric stretching system is provided that can be assembled from bulk materials that can be sized for individual frames using conventional equipment in frame shops.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a stretcher system for a flexible fabric material. The stretcher includes side pieces that are miter-cut to a desired length from a profiled strip of extruded material to form a frame for support of the fabric. The profiled strips have a cross-section that provides a flat edge forming an outer border of the stretcher, a bead on the frame to support the fabric above the frame member, an internal cavity, and an exterior channel. First corner braces are inserted within the internal cavity to secure corners of the frame that are formed when the profiled strip is miter cut. Second corner braces facilitate tensioning adjustment of the material, each second brace fitting within the external channel and having (a) four oval holes for use in securing the second braces to the external channel of the profiled strip; and (b) two holes for insertion of tensioning screws. Each corner of the frame is secured by one first brace and one second brace.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION

This invention relates to a canvas stretcher frame which utilizes an extruded, profiled material for the frame and molded plastic or cast metal corner braces fitting into features of the frame to provide simple assembly and tensioning for mounting artists' canvas or other fabric. The extruded material used for the frames may be made of sawdust and other organic filler material bound in a plastic matrix, or may be an extruded metal, such as aluminum, or a plastic material. It preferably has the weight and feel of a traditional wood frame, but it does not warp and crack with age or change dimensions with changes in ambient moisture. As it is extruded, the framing bar is produced with a bead on the front surface to provide proper support to only the outer edge of the canvas or other fabric affixed and with features to accept the corner braces which hold the frame together and allow tensioning. Assembly and tensioning are accomplished using two identical molded plastic or cast metal braces in each corner of the frame. One of the braces which contains no screws but provides stability for the frame while assembly is in process fits into the internal cavity of the adjoining frame members at each corner. The second brace in each corner contains two mutually perpendicular machine screws, each with a nut captured in a slot in the brace, for tensioning the fabric after assembly and is placed in the external channel of the adjoining frame members and retained in place with four screws passing into the frame material. The internal cavity and external channel, which can also be used for optional cross braces that will then fit flush within the frame, are created in the frame stock when it is extruded. The frame stock can be cut to a desired length with a simple miter saw and requires no further machining or milling. Assembly and tensioning require no special tools. Due to the simplicity of the system a retail frame shop can stock bulk frame material which is cut to length as needed rather than stocking a large number of pre-cut lengths of frame material.

Figure 1:
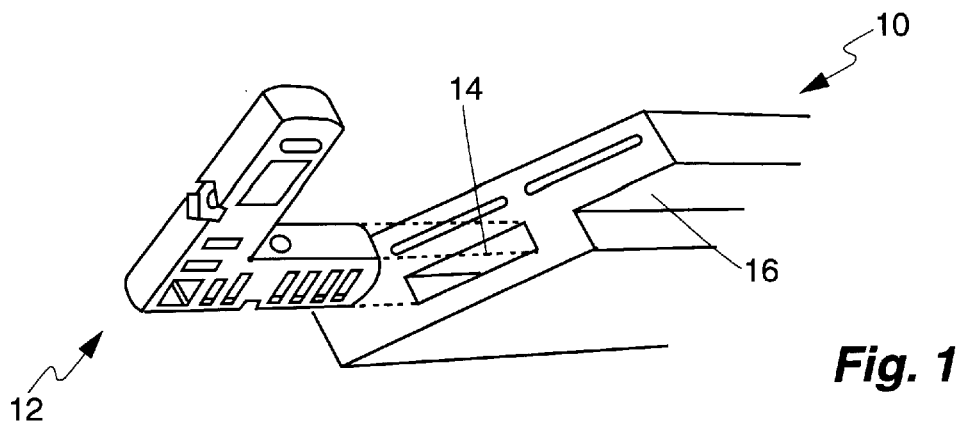
FIG. 1 is an isometric illustration of frame and brace components according to one embodiment of the present invention.

The simplicity of this fabric stretching system will become apparent from an inspection of the drawings. As shown in FIG. 1, the system comprises of two basic elements: extruded frame 10 and molded or cast corner braces 12. The internal cavity 14 and external channel 16 are sized and shaped in the extrusion process to accept corner braces 12 and optional cross braces during assembly of a frame. Bead 15 (FIG. 4) is extruded into the front surface of frame 10 to support the fabric without allowing it to come into contact with the entire front surface of the frame.

Figure 2:
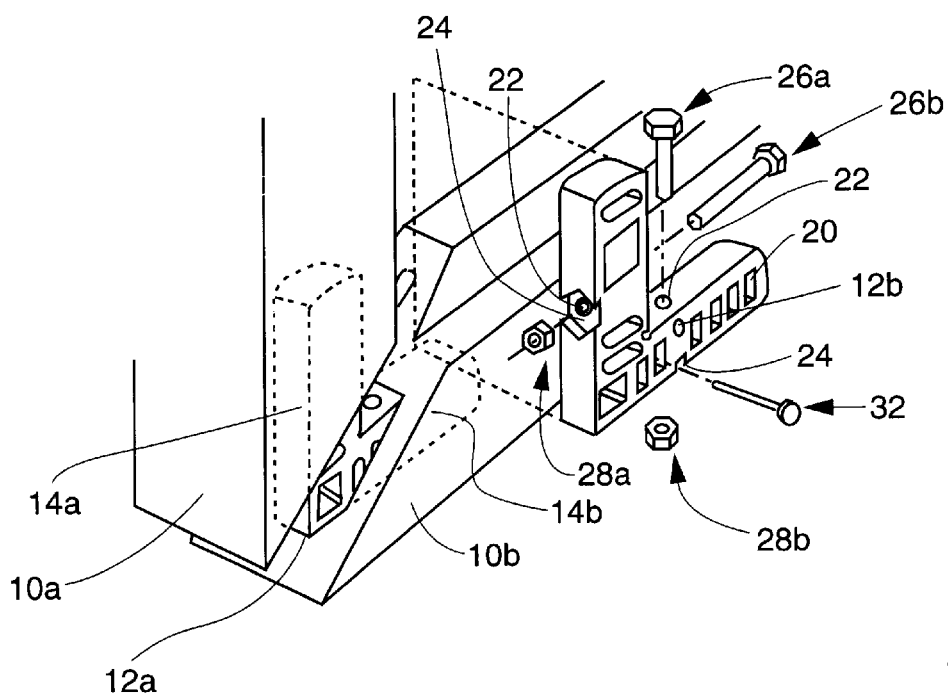
FIG. 2 is an isometric illustration of the relationship of components in assembly according to one embodiment of the present invention.

FIG. 2 more particularly depicts a corner assembly of frame bars 10a and 10b with corner braces 12a and 12b. Each complete frame requires eight (8) identical corner braces 12, as more particularly shown in FIG. 4. Corner braces 12 can be molded of plastic or cast of metal with equal success. Of importance in the design of the corner braces are the four (4) holes 18, 20 for screws suitable for securing the material forming frame bars 10a, 10b, two (2) holes 22 for machine screws and two (2) slots 24 for machine nuts, all of which will be used during assembly of the second or outer brace into each corner of the completed frame. Note that holes 18, 20 are oval; the major axes of one pair 18 being oriented in a direction orthogonal to that of the other pair 20.

Figure 3:
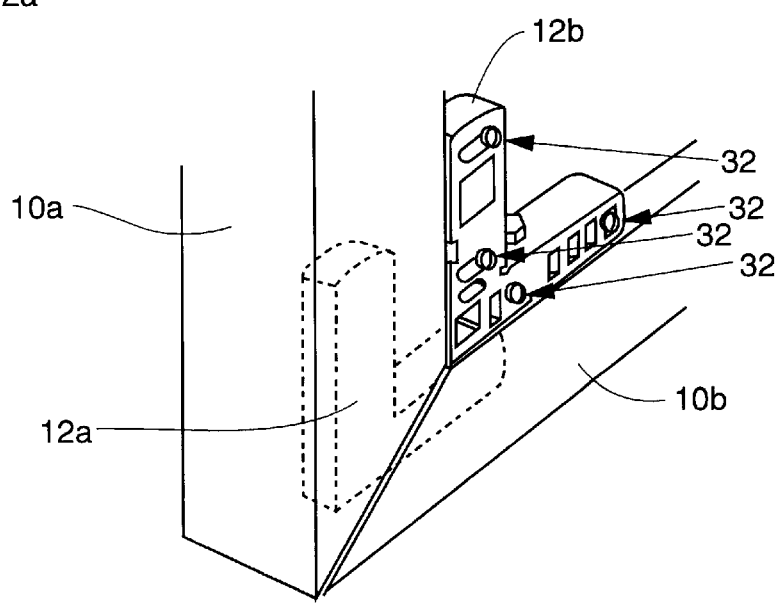
FIG. 3 is an isometric illustration of an assembled frame corner with the components shown in FIG. 2.

FIGS. 1–3 illustrate assembly of a corner of the stretcher frame. FIG. 1 illustrates the placement of first corner brace 12 into internal cavity 14 of the framing bar 10. As seen in FIG. 2, first corner brace 12a contains no screws and is held in place by a snug fit within cavities 14a, 14b. Second corner brace 12b is placed into channel 16 on the back surface of framing bar 10. The mutually perpendicular machine screws 26a, 26b are inserted into holes 22 with their respective nuts retained in slots 24. Screw 32 (1 of 4) is shown being inserted into an oval hole 18 or 29 of brace 12b. Screw 32 passes into frame bar 10 and holds brace 12b in place. FIG. 3 shows the completed corner with all four (4) screws 32 in place.

Figure 4:
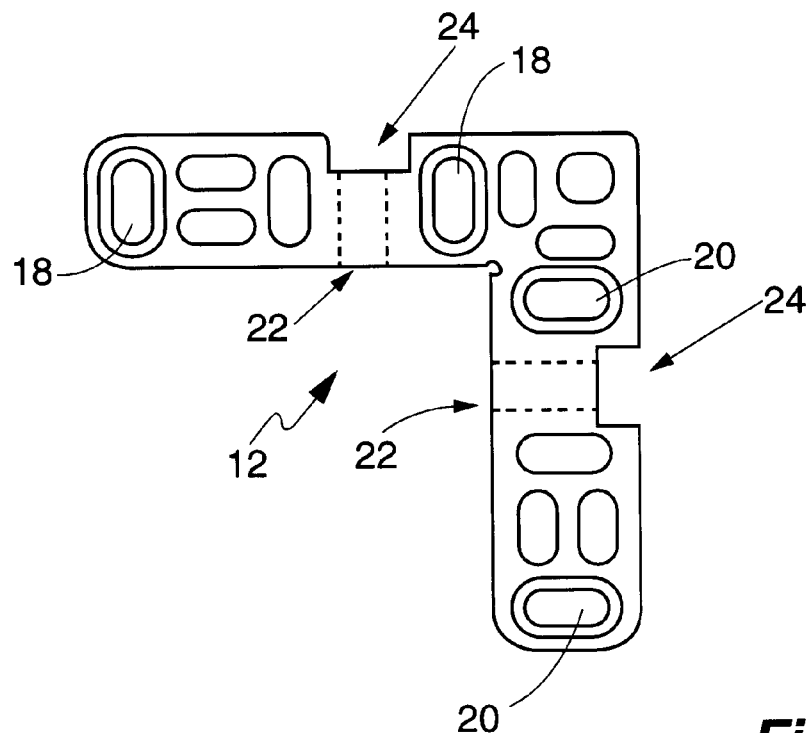
FIG. 4 is a side view of a brace according to one embodiment of the present invention.
Figure 5:
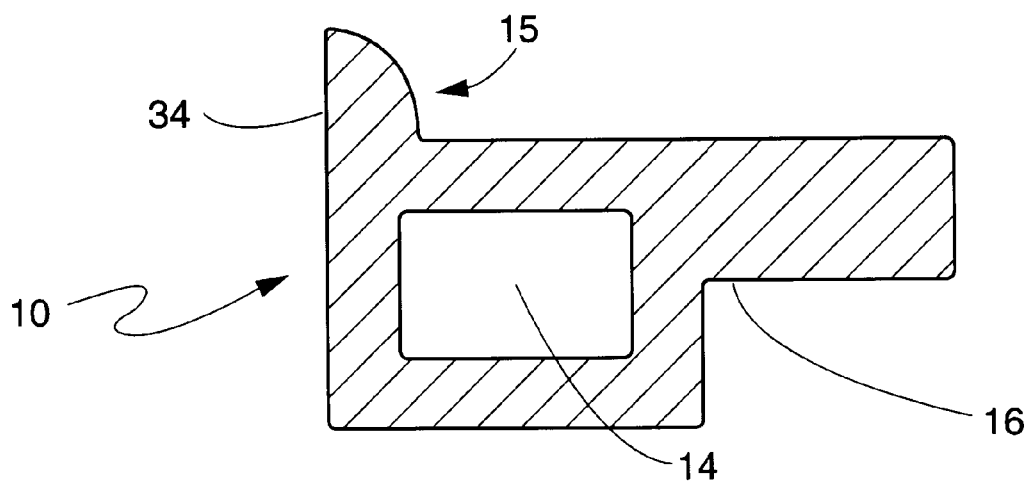
FIG. 5 is a cross-section of an extruded frame member according to one embodiment of the present invention.

The preferred embodiment of this fabric stretching system utilizes the framing bars 10, shown in FIG. 1 and in cross-section in FIG. 5, and eight (8) molded plastic corner braces 12 as shown in FIG. 4. Framing bar 10 is formed as an extrusion in any length of a wood-like material, e.g., sawdust and other organic material bonded in a plastic matrix. Frame bar 10 is extruded complete with internal cavity 14, external channel 16 and fabric support bead, as shown in FIG. 5. No further profile shaping is required. Extruded framing bar 10 is then miter cut to the desired length. This operation can be performed on the same saws used to miter conventional wood frames.

The corner braces of the preferred embodiment are molded of hard plastic to the shape shown in FIG. 4. All features shown may be produced in a molding process or may be machined in a subsequent operation. The four (4) holes 18, 20 through which screws will be inserted during assembly are oval in shape; the major axes of one pair 18 in a direction orthogonal to that of the other pair 20 to allow movement in either an up-down or sideways direction during tensioning. The two (2) slots 24 are shaped to retain and prevent the turning of the nuts of the machine screws that will be inserted in assembly. The other holes and slots shown are not functional but are included to control wall thickness of the component thus reducing stress during a molding process.

FIG. 1 illustrates the first step in the assembly of a frame. Four (4) miter cut lengths of framing bar 10 cut to the desired length are required. Corner brace 12 without any screws or nuts is inserted into internal cavity 14 of each of the miter cut corners of each framing bar 10. Brace 12 fits snugly into the internal cavity of each framing bar 10 and hold the frame rigid for the remainder of the assembly process. A corner brace with the same overall shape and size but without such features could be used, but this would require that a second mold be prepared and that the frame shop stock two different designs of corner brace rather than one as is preferred.

The second step in assembly is illustrated in FIG. 2. Machine screws 26a, 26b are inserted into mutually perpendicular holes 22 of each corner brace 12b and threaded into their respective nuts 26a, 26b, each of which is retained in a slot 24. Screws 26a, 26b are not tightened. This will be done when the canvas is tensioned. Corner brace 12a containing machine screw 26a, 26b and nuts 28a, 28b is then placed into channel 16 (FIG. 1) of framing bars 10a, 10b at each corner of the frame and retained with four (4) screws 32, as seen in FIG. 3, each inserted into an oval hole 18, 20 (FIG. 4) of corner brace 12b and threaded into the wood-like framing bars 10a, 10b. The screws are not tightened at this step.

In the next step the canvas or other fabric is be stretched by hand as tightly as possible across the face of the assembled frame and tacked, stapled or glued to the framing bars as with a conventional wood frame. As shown in FIG. 5, fabric support beads 15 are provided on a flat edge 34 forming an outer border of framing bar 10 to support the fabric only along the edge of the frame and prevent it from contacting the entire front surface 34 of an assembled frame, a preferred means of mounting fabric. If additional tensioning is required after the fabric is installed machine screws 26a, 26b (FIG. 2) in each corner brace 12b of the frame are rotated to add tension. When the desired tension is obtained the four (4) screws 32 in each corner brace 12b (FIG. 3) are tightened to secure the completed frame. At some future time, when the canvas may have stretched due to age, changing moisture or as a result of some type of paint having been applied, additional tension may be applied by first slightly loosening screws 32 then rotating machine screws 26a, 26b in each of corner brace 12b. Screws 32 would be again tightened after the desired tension was obtained. If added tension is needed in only one direction, then only the screws in the pair of oval holes allowing movement in that direction would be loosened and only the machine screws applying tension in that direction would be rotated. The tension in the other direction on the canvas would not be disturbed.

A second embodiment of this fabric stretching system would be to use cast or machined metal corner braces 12 (FIG. 1) in place of the molded plastic braces. The metal braces would have all of the functional features of the plastic braces. The nonfunctional features used to control wall thickness and reduce stress would be different depending on the metal used. The completed framing system would be assembled as previously described and would produce the same result.

The foregoing description of the fabric stretching system according to the present invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A stretcher system for a flexible fabric material, said stretcher comprising:
   (A) side pieces miter-cut to a desired length from a profiled strip to form a frame for support of said fabric, said profiled strip having a cross-section that provides
      (a) a flat edge forming an outer border of said stretcher,
      (b) a bead on said frame to support said fabric above said frame member,
      (c) an internal cavity, and
      (d) an exterior channel;
   (B) first corner braces for inserting within said internal cavity to secure corners of said frame formed when said profiled strip is miter cut;
   (C) second corner braces for facilitating tensioning adjustment of said material, each said second brace fitting within said external channel and having
      (a) four oval holes for use in securing said second braces to said external channel of said profiled strip;
      (b) two holes for insertion of tensioning screws;
   (D) each corner of said frame being secured by one said first brace and one said second brace.

2. A stretcher system according to claim 1, wherein said second corner brace includes two legs at right angles to one another, each one of said legs having a pair of said oval holes, wherein a pair of oval holes in one of said legs have axes orthogonal to axes of a pair of oval holes in a second one of said legs.

3. A stretcher system according to claim 2, wherein said holes for said tensioning screws are orthogonal for urging mating ones of said side pieces to move in orthogonal directions for stretching said material.

4. A stretcher system according to claim 3, further including slots at ends of said holes for said tensioning screws facing said adjacent side pieces shaped to retain nuts for securing said tensioning screws within said holes.

5. A stretcher system according to claim 4, wherein said first and second braces are identically formed.

* * * * *